US011874397B2

(12) United States Patent
Isoda

(10) Patent No.: US 11,874,397 B2
(45) Date of Patent: Jan. 16, 2024

(54) RADAR DEVICE AND SIGNAL PROCESSING METHOD

(71) Applicant: Mitsubishi Electric Corporation, Tokyo (JP)

(72) Inventor: Kentaro Isoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 532 days.

(21) Appl. No.: 17/191,878

(22) Filed: Mar. 4, 2021

(65) Prior Publication Data

US 2021/0190911 A1 Jun. 24, 2021

Related U.S. Application Data

(63) Continuation of application No. PCT/JP2018/044361, filed on Dec. 3, 2018.

(51) Int. Cl.
| | |
|---|---|
| G01S 7/41 | (2006.01) |
| G01S 7/42 | (2006.01) |
| G01S 7/02 | (2006.01) |
| H04B 7/0413 | (2017.01) |

(52) U.S. Cl.
CPC ............... *G01S 7/41* (2013.01); *G01S 7/021* (2013.01); *G01S 7/42* (2013.01); *H04B 7/0413* (2013.01)

(58) Field of Classification Search
CPC .......... G01S 7/42; G01S 7/021; H04B 7/0413
See application file for complete search history.

(56) References Cited

U.S. PATENT DOCUMENTS

2002/0181799 A1* 12/2002 Matsugu ................ G06V 10/94
382/260

FOREIGN PATENT DOCUMENTS

JP 6079709 B2 2/2017

OTHER PUBLICATIONS

Fortuny-Guasch Joaquim et al. EP 2315311 A1 (Year: 2011).*
(Continued)

*Primary Examiner* — Timothy A Brainard
*Assistant Examiner* — Helena H Seraydaryan
(74) *Attorney, Agent, or Firm* — Birch, Stewart, Kolasch & Birch, LLP

(57) ABSTRACT

A radar device includes: a signal transmission unit for generating a MIMO signal including a plurality of pulse signals, and radiating the MIMO signal into space; a signal reception unit for receiving a reflection signal resulting from reflection, by a target, of the MIMO signal radiated from the signal transmission unit; a demodulation unit for demodulating the MIMO signal from the reflection signal received by the signal reception unit; a beam-forming unit for forming beams in a plurality of different directions, by multiplying the plurality of pulse signals included in the MIMO signal demodulated by the demodulation unit by a respective plurality of different weighting coefficients; a control unit for changing noise power included in each of the beams in the plurality of directions formed by the beam-forming unit, by shifting a phase of the MIMO signal generated by the signal transmission unit and adjusting the plurality of weighting coefficients on the basis of an amount of phase shift of the phase; and a target detection unit for detecting the target from each of the beams in the plurality of directions formed by the beam-forming unit.

6 Claims, 4 Drawing Sheets

(56) References Cited

OTHER PUBLICATIONS

Guimei Zheng, "DOA Estimation in MIMO Radar With Non-Perfectly Orthogonal Waveforms", IEEE Communications Letters, Feb. 2017, vol. 21, No. 2, p. 414-417.
Sun et al., "Analysis and Comparison of MIMO Radar Waveforms", 2014 International Radar Conference, 2014, p. 1-6.
Sun et al., "DOA Estimation in MIMO Radar With Non-Perfectly Orthogonal Waveforms", 2014 International Radar Conference, 2014, p. 1-6.

* cited by examiner

RADAR DEVICE AND SIGNAL PROCESSING METHOD

CROSS REFERENCE TO RELATED APPLICATIONS

This application is a Continuation of PCT International Application No. PCT/JP2018/044361 filed on Dec. 3, 2018, which is hereby expressly incorporated by reference into the present application.

TECHNICAL FIELD

The present invention relates to a radar device for detecting a target and a signal processing method.

BACKGROUND ART

A radar device may be equipped with multiple-input multiple-output (MIMO) radar technology for receiving a reflection signal resulting from reflection, by a target, of a MIMO signal including a plurality of pulse signals, and demodulating the MIMO signal from the reflection signal.

The radar device equipped with MIMO radar technology forms beams in a plurality of different directions by multiplying the plurality of pulse signals included in the demodulated MIMO signal by a respective plurality of different weighting coefficients.

Then, the radar device detects a target from each of the formed beams in the plurality of directions.

The demodulated MIMO signal may have cross-correlation between the plurality of pulse signals included in the demodulated MIMO signal. In a case where the demodulated MIMO signal has cross-correlation between the plurality of pulse signals included in the demodulated MIMO signal, noise powers included in the respective beams in the plurality of directions are different from each other.

Therefore, the radar device may not be able to detect a target present in a specific direction, because the noise power included in a beam in a specific direction from among the beams in the plurality of directions is great. Thus, the ability to detect the target may deteriorate.

Non-Patent Document 1 below describes a radar device that generates a matrix (hereinafter referred to as "whitening matrix") for whitening noise power, from the Kronecker product of the complex conjugate of a correlation matrix of the demodulated MIMO signal and the identity matrix.

The radar device described in Non-Patent Document 1 whitens the noise power included in each of the beams in the plurality of directions by multiplying the demodulated MIMO signal by a whitening matrix.

CITATION LIST

Non-Patent Literature

Non-Patent Literature 1: Guimei Zheng, "DOA Estimation in MIMO Radar With Non-Perfectly Orthogonal Waveforms", IEEE COMMUNICATIONS LETTERS, pp. 414-417, VOL. 21, NO. 2, FEBRUARY 2017.

SUMMARY OF INVENTION

Technical Problem

The radar device described in Non-Patent Document 1 needs to perform signal processing for generating the whitening matrix and signal processing for multiplying the MIMO signal by the whitening matrix, in addition to signal processing for demodulating the MIMO signal, signal processing for forming beams, and signal processing for detecting a target.

Therefore, the radar device described in Non-Patent Document 1 has a problem that the scale of the device increases because of the execution of the signal processing for generating the whitening matrix and the signal processing for multiplying the MIMO signal by the whitening matrix.

The present invention has been accomplished to address the above problem, and an object of the present invention is to provide a radar device and a signal processing method with which deterioration in ability to detect a target can be reduced, without executing signal processing for generating a whitening matrix and signal processing for multiplying a MIMO signal by the whitening matrix.

Solution to Problem

The radar device according to the present invention includes: a signal transmitter to generate a MIMO signal including a plurality of pulse signals, and radiate the MIMO signal into space; a signal receiver to receive a reflection signal resulting from reflection, by a target, of the MIMO signal radiated from the signal transmitter; demodulation circuitry to demodulate the MIMO signal from the reflection signal received by the signal receiver; beam-forming circuitry to form beams in a plurality of different directions, by multiplying the plurality of pulse signals included in the MIMO signal demodulated by the demodulation circuitry by a respective plurality of different weighting coefficients; control circuitry to change noise power included in each of the beams in the plurality of directions formed by the beam-forming circuitry, by shifting a phase of the MIMO signal generated by the signal transmitter and adjusting the plurality of weighting coefficients on the basis of an amount of phase shift of the phase; and target detection circuitry to detect the target from each of the beams in the plurality of directions formed by the beam-forming circuitry.

Advantageous Effects of Invention

According to the present invention, the radar device is configured so that the control unit shifts the phase of the MIMO signal generated by the signal transmission unit, and adjusts a plurality of weighting coefficients on the basis the amount of phase shift, thereby changing noise power included in each of the beams in the plurality of directions formed by the beam-forming unit. Therefore, the radar device according to the present invention can reduce deterioration in the ability to detect a target, without performing the signal processing for generating the whitening matrix and the signal processing for multiplying the MIMO signal by the whitening matrix.

BRIEF DESCRIPTION OF DRAWINGS

FIG. 3 is a hardware configuration diagram of a computer in a case where the signal processing unit 8 is implemented by software, firmware, or the like.

DESCRIPTION OF EMBODIMENTS

In order to describe the present invention in more detail, a mode for carrying out the present invention will now be described with reference to the accompanying drawings.

First Embodiment

Figure 1:
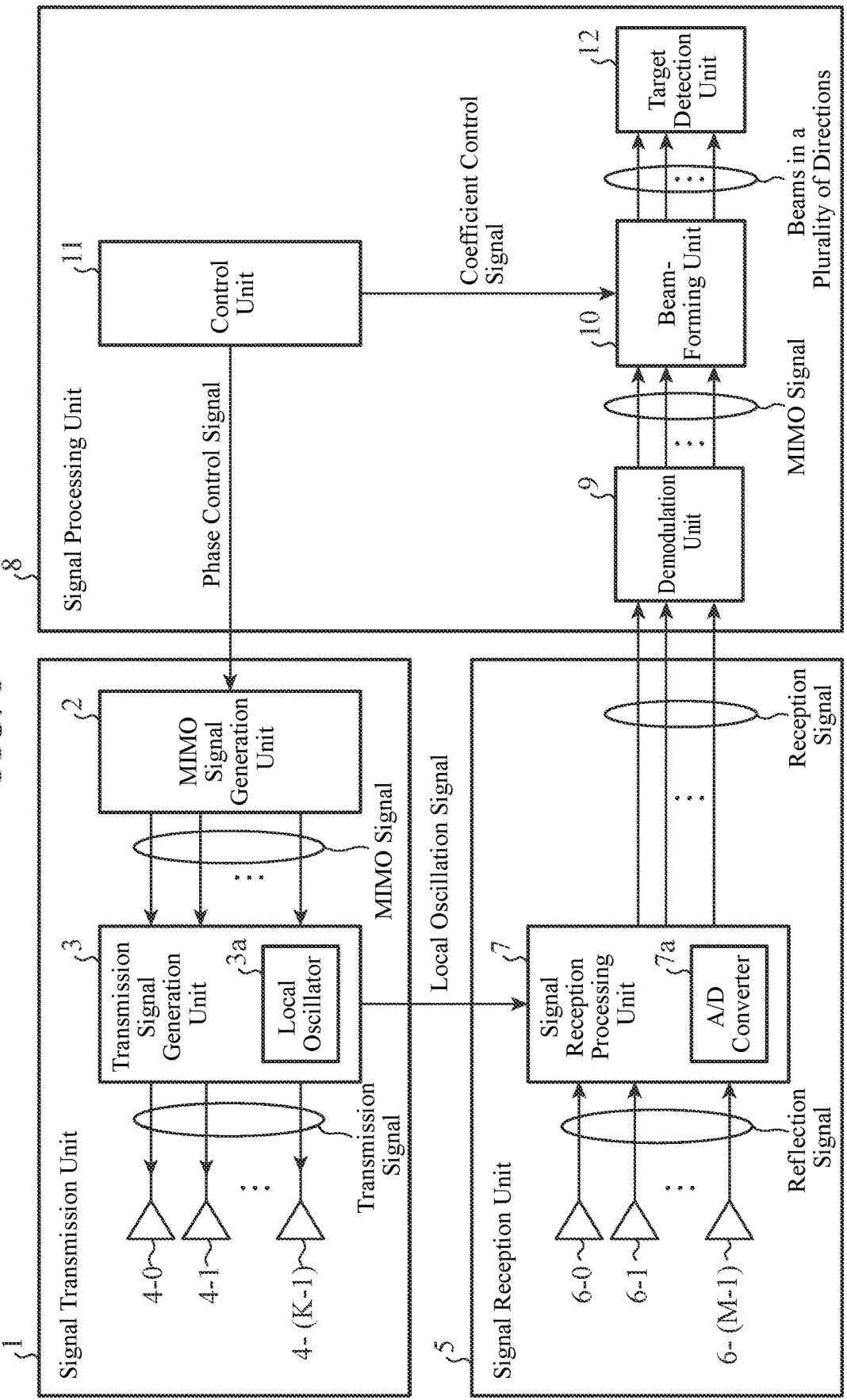
FIG. 1 is a configuration diagram showing a radar device according to a first embodiment.

FIG. 1 is a configuration diagram showing a radar device according to a first embodiment.

Figure 2:
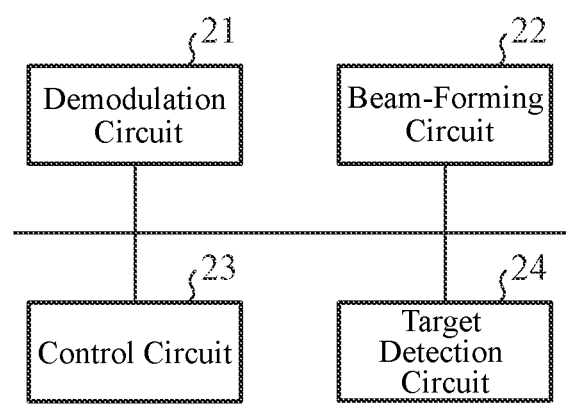
FIG. 2 is a hardware configuration diagram showing a hardware of a signal processing unit 8 included in the radar device shown in FIG. 1.

FIG. 2 is a hardware configuration diagram showing a hardware of a signal processing unit 8 included in the radar device shown in FIG. 1.

In FIGS. 1 and 2, a signal transmission unit 1 includes a MIMO signal generation unit 2, a transmission signal generation unit 3, and transmission antennas 4-0 to 4-(K−1).

The signal transmission unit 1 generates a multiple-input multiple-output (MIMO) signal having a phase indicated by a phase control signal output from a control unit 11.

The signal transmission unit 1 radiates the generated MIMO signal into space.

The MIMO signal generation unit 2 generates a MIMO signal having the phase indicated by the phase control signal output from the control unit 11, and outputs the MIMO signal to the transmission signal generation unit 3.

The MIMO signal generated by the MIMO signal generation unit 2 includes the same number of pulse signals as the number of transmission antennas 4-0 to 4-(K−1). K is an integer greater than or equal to 2.

The transmission signal generation unit 3 includes a local oscillator 3a that outputs a local oscillation signal.

The transmission signal generation unit 3 converts the frequency of the MIMO signal into a radio frequency (RF) using the local oscillation signal output from the local oscillator 3a.

The transmission signal generation unit 3 outputs the MIMO signal having RF as the frequency, as a transmission signal, to the transmission antennas 4-0 to 4-(K−1).

Since the local oscillation signal output from the local oscillator 3a is used not only by the transmission signal generation unit 3 but also by a signal reception processing unit 7, the local oscillator 3a outputs the local oscillation signal to the signal reception processing unit 7.

The transmission antennas 4-0 to 4-(K−1) radiate the pulse signals included in the transmission signal output from the transmission signal generation unit 3 into space.

The signal transmission unit 1 shown in FIG. 1 includes K transmission antennas 4-0 to 4-(K−1). However, this is merely an example, and the signal transmission unit 1 may include, for example, a sub-array antenna having K element antennas.

The signal reception unit 5 includes reception antennas 6-0 to 6-(M−1) and the signal reception processing unit 7. M is an integer greater than or equal to 1.

The signal reception unit 5 receives a reflection signal resulting from reflection, by a target, of the transmission signal radiated from the signal transmission unit 1.

The reception antennas 6-0 to 6-(M−1) receive a plurality of pulse signals included in the transmission signal reflected by the target, and output the pulse signals to the signal reception processing unit 7 as reflection signals.

The signal reception unit 5 shown in FIG. 1 includes M reception antennas 6-0 to 6-(M−1). However, this is merely an example, and the signal reception unit 5 may include, for example, a sub-array antenna having M element antennas.

The radar device shown in FIG. 1 includes transmission antennas 4-0 to 4-(K−1) and reception antennas 6-0 to 6-(M−1). However, this is merely an example, and the radar device may be equipped with K transmission and reception antennas.

The signal reception processing unit 7 includes an analog-to-digital converter (hereinafter, referred to as "A/D converter") 7a.

The signal reception processing unit 7 converts the frequency of a reflection signal including the plurality of pulse signals output from the reception antennas 6-0 to 6-(M−1), into a baseband frequency, using the local oscillation signal output from the local oscillator 3a.

The signal reception processing unit 7 converts the reflection signal having the baseband frequency from an analog signal to a digital signal using the A/D converter 7a, and outputs the digital signal to a demodulation unit 9 as a reception signal.

The A/D converter 7a converts the reflection signal from an analog signal to a digital signal, and outputs the digital signal to the demodulation unit 9 as a reception signal.

The signal processing unit 8 includes the demodulation unit 9, a beam-forming unit 10, a control unit 11, and a target detection unit 12.

The demodulation unit 9 is implemented by, for example, a demodulation circuit 21 shown in FIG. 2.

The demodulation unit 9 demodulates the MIMO signal generated by the MIMO signal generation unit 2, from the reception signal output from the signal reception processing unit 7.

The demodulation unit 9 outputs the demodulated MIMO signal to the beam-forming unit 10.

The beam-forming unit 10 is implemented by, for example, a beam-forming circuit 22 shown in FIG. 2.

The beam-forming unit 10 forms beams in a plurality of different directions by multiplying the plurality of pulse signals included in the MIMO signal output from the demodulation unit 9 by a respective plurality of different weighting coefficients indicated by a coefficient control signal output from the control unit 11.

The beam-forming unit 10 outputs the formed beams in the plurality of directions to the target detection unit 12.

The control unit 11 is implemented by, for example, a control circuit 23 shown in FIG. 2.

The control unit 11 outputs a phase control signal indicating the phase of the MIMO signal to the MIMO signal generation unit 2, thereby shifting the phase of the MIMO signal generated by the MIMO signal generation unit 2.

The control unit 11 shifts the phase of the MIMO signal generated by the MIMO signal generation unit 2, each time one scan is completed, for example. In one scan, the transmission signal is repeatedly radiated from the transmission antennas 4-0 to 4-(K−1) toward a target search area as shown in FIG. 6.

Figure 6:
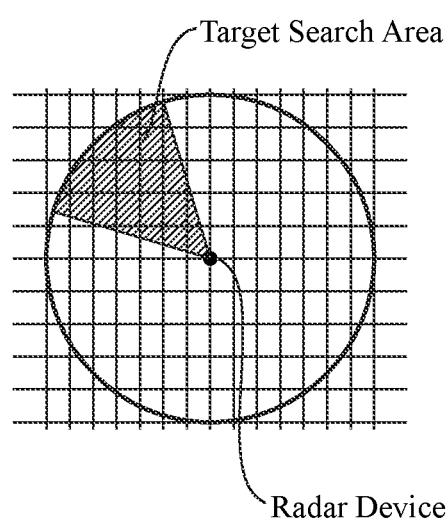
FIG. 6 is an explanatory diagram showing an example of a target search area in the radar device shown in FIG. 1.

FIG. 6 is an explanatory diagram showing an example of the target search area in the radar device shown in FIG. 1.

The phase of the MIMO signal shifted by the control unit 11 is the same until the completion of one scan in which the transmission signal is repeatedly radiated to the target search area from the transmission antennas 4-0 to 4-(K−1) in order to search a target present within the search area by the target detection unit 12. Scan indicates that, in order to obtain reflection signals from all targets present within the target search area, the transmission signal is repeatedly radiated from the transmission antennas 4-0 to 4-(K−1) so that the transmission signal spreads all over the target search area.

The control unit 11 outputs a coefficient control signal indicating a plurality of weighting coefficients corresponding to an amount of phase shift of the MIMO signal to the beam-forming unit 10, thereby adjusting a plurality of weighting coefficients to be multiplied by the beam-forming unit 10.

Since the plurality of weighting coefficients is adjusted by the control unit 11, noise powers included in the respective beams in the plurality of directions formed by the beam-forming unit 10 each change.

The target detection unit 12 is implemented by, for example, a target detection circuit 24 shown in FIG. 2.

The target detection unit 12 detects a target from each of the beams in the plurality of directions formed by the beam-forming unit 10.

In FIG. 1, it is assumed that the demodulation unit 9, the beam-forming unit 10, the control unit 11, and the target detection unit 12, which are the components of the signal processing unit 8, are each implemented by dedicated hardware as shown in FIG. 2. That is, it is assumed that the signal processing unit 8 is implemented by the demodulation circuit 21, the beam-forming circuit 22, the control circuit 23, and the target detection circuit 24.

Here, each of the demodulation circuit 21, the beam-forming circuit 22, the control circuit 23, and the target detection circuit 24 is, for example, a single circuit, a composite circuit, a programmed processor, a parallel programmed processor, an application specific integrated circuit (ASIC), a field-programmable gate array (FPGA), or a combination of some of these circuits.

The components of the signal processing unit 8 are not limited to be implemented by dedicated hardware, and the signal processing unit 8 may be implemented by software, firmware, or a combination of software and firmware.

Software or firmware is stored in a memory of a computer, as a program. The computer means hardware that executes the program, and may be, for example, a central processing unit (CPU), central processor, processing unit, computing unit, microprocessor, microcomputer, processor, or digital signal processor (DSP).

Figure 3:
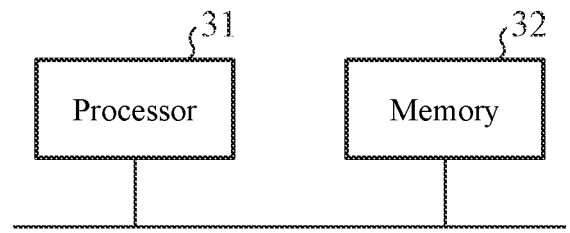

FIG. 3 is a hardware configuration diagram of a computer in a case where the signal processing unit 8 is implemented by software, firmware, or the like.

In a case where the signal processing unit 8 is implemented by software, firmware, or the like, a program for causing the computer to execute the processing procedures of the demodulation unit 9, the beam-forming unit 10, the control unit 11, and the target detection unit 12 is stored in a memory 32. Then, the processor 31 of the computer executes the program stored in the memory 32.

Figure 4:
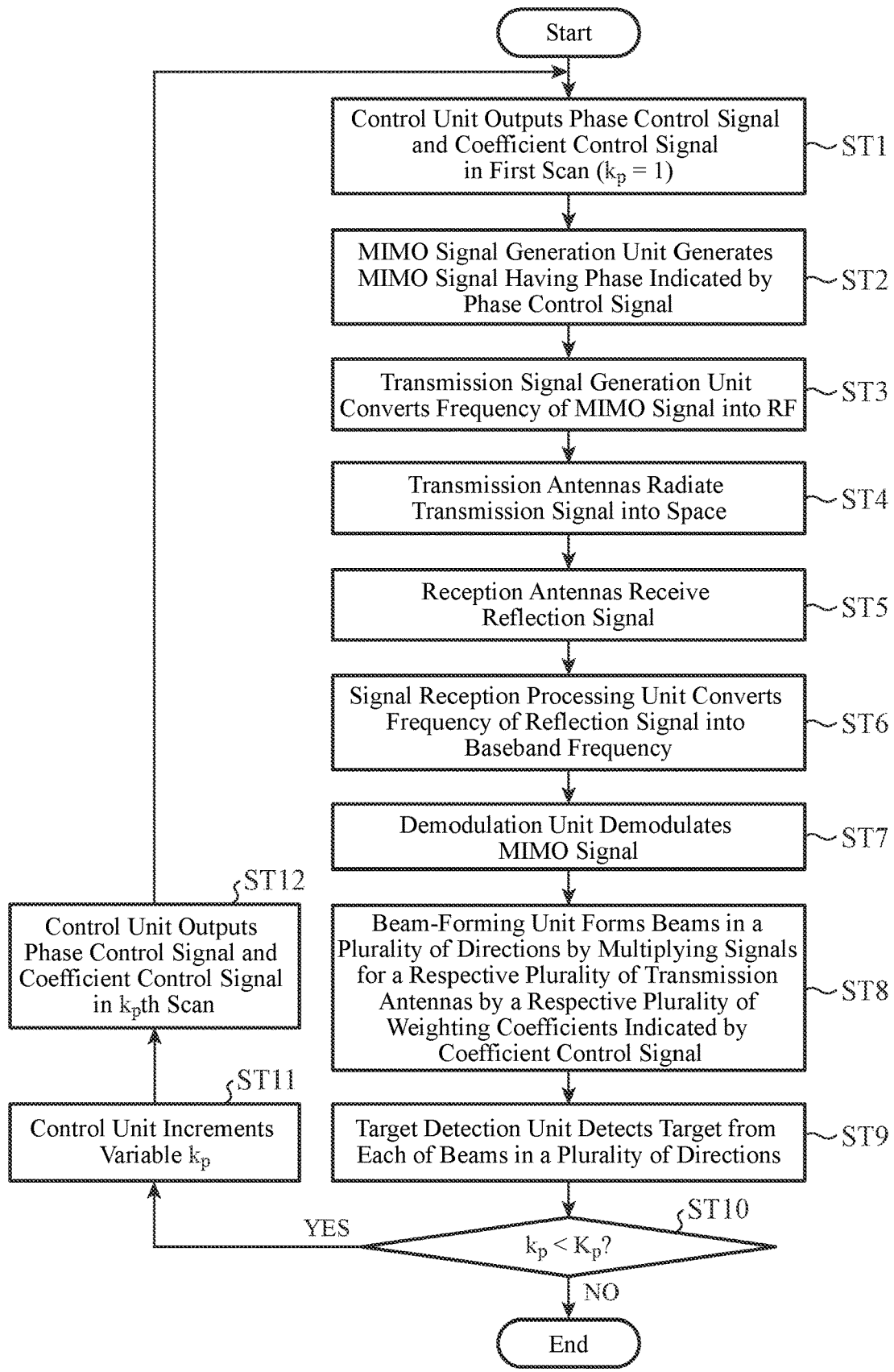
FIG. 4 is a flowchart showing a processing procedure of the signal processing unit 8.

FIG. 4 is a flowchart showing a processing procedure of the signal processing unit 8.

Further, FIG. 2 shows an example in which each of the components of the signal processing unit 8 is implemented by dedicated hardware, and FIG. 3 shows an example in which the signal processing unit 8 is implemented by software, firmware, or the like. However, these are merely examples, and some components in the signal processing unit 8 may be implemented by dedicated hardware, and the remaining components may be implemented by software, firmware, or the like.

Next, the operation of the radar device shown in FIG. 1 will be described.

In the radar device shown in FIG. 1, a variable indicating the scan order is represented by $k_p$, and $k_p$ is initially set to 1.

An amount of phase shift of the MIMO signal in the $k_p$th scan and the plurality of weighting coefficients corresponding to the amount of phase shift will be described later.

First, the control unit 11 outputs a phase control signal indicating the phase of the MIMO signal in the first scan ($k_p=1$) to the MIMO signal generation unit 2, and outputs the coefficient control signal indicating a plurality of weighting coefficients corresponding to the amount of phase shift of the MIMO signal to the beam-forming unit 10 (step ST1 in FIG. 4).

The MIMO signal generation unit 2 generates a MIMO signal having the phase indicated by the phase control signal output from the control unit 11 (step ST2 in FIG. 4).

The MIMO signal generated by the MIMO signal generation unit 2 includes K pulse signals.

The MIMO signal generation unit 2 outputs the MIMO signal including K pulse signals to the transmission signal generation unit 3.

When receiving the MIMO signal from the MIMO signal generation unit 2, the transmission signal generation unit 3 converts the frequency of the MIMO signal into RF using the local oscillation signal output from the local oscillator 3a (step ST3 in FIG. 4).

The transmission signal generation unit 3 sets the MIMO signal having the RF as a frequency, as a transmission signal, and outputs the plurality of pulse signals included in the transmission signal to the respective transmission antennas 4-0 to 4-(K−1).

Since the local oscillation signal output from the local oscillator 3a is used not only by the transmission signal generation unit 3 but also by the signal reception processing unit 7, the local oscillator 3a outputs the local oscillation signal to the signal reception processing unit 7.

The transmission antennas 4-0 to 4-(K−1) radiate the respective pulse signals included in the transmission signal output from the transmission signal generation unit 3 into space (step ST4 in FIG. 4).

If there is a target in the space, the pulse signals radiated into the space from the respective transmission antennas 4-0 to 4-(K−1) are reflected by the target. The plurality of pulse signals reflected by the target is returned to the radar device shown in FIG. 1.

The reception antennas 6-0 to 6-(M−1) receive, as reflection signals, the respective pulse signals reflected by the target (step ST5 in FIG. 4).

The plurality of pulse signals received by the reception antennas 6-0 to 6-(M−1) is output to the signal reception processing unit 7, as a reflection signal.

When receiving the reflection signal from the reception antennas 6-0 to 6-(M−1), the signal reception processing unit 7 converts the frequency of the reflection signal into a baseband frequency, using the local oscillation signal output from the local oscillator 3a (step ST6 in FIG. 4).

The signal reception processing unit 7 converts the reflection signal having the baseband frequency from an analog signal to a digital signal using the A/D converter 7a, and outputs the digital signal to the demodulation unit 9 as a reception signal.

When receiving the reception signal from the signal reception processing unit 7, the demodulation unit 9 calculates a frequency domain signal from the reception signal, for example, by Fourier transformation of the reception signal (step ST7 in FIG. 4).

By determining a plurality of frequency components included in the frequency domain signal to be the respective plurality of pulse signals (hereinafter referred to as "signals for respective transmission antennas) included in the MIMO signal generated by the MIMO signal generation unit 2, the demodulation unit 9 demodulates the MIMO signal (step ST7 in FIG. 4).

The demodulation unit 9 outputs a plurality of the signals for respective transmission antennas to the beam-forming unit 10, as the demodulated MIMO signal.

Hereinafter, the demodulation process of the MIMO signal by the demodulation unit 9 will be specifically described.

For example, it is supposed that the number of transmission antennas is two, and the transmission antennas 4-0 and 4-1 radiate two pulse signals included in the transmission signal output from the transmission signal generation unit 3 into space.

If an amount of phase shift of the MIMO signal in the first scan is 0, an amount of phase shift of the MIMO signal in the second scan is 1, and the target is stationary, spectra are piled up at a frequency $f_0$ corresponding to the amount of phase shift of 0 and a frequency f corresponding to the amount of phase shift of 7.

The demodulation unit 9 sets, as the signals for respective transmission antennas, a signal component of the frequency $f_0$ as the signal of the transmission antenna 4-0 and a signal component of the frequency $f_\pi$ as the signal of the transmission antenna 4-1.

The demodulation unit 9 outputs the signal of the transmission antenna 4-0 and the signal of the transmission antenna 4-1 to the beam-forming unit 10 as the signals for respective transmission antennas.

The beam-forming unit 10 forms beams in a plurality of different directions by multiplying the plurality of signals for respective transmission antennas output from the demodulation unit 9 by respective different weighting coefficients indicated by the coefficient control signal output from the control unit 11 (step ST8 in FIG. 4).

The beam-forming unit 10 outputs the formed beams in the plurality of directions to the target detection unit 12.

When receiving the beams in the plurality of directions from the beam-forming unit 10, the target detection unit 12 detects a target from each of the beams in the plurality of directions (step ST9 in FIG. 4).

A process for detecting a target from beams is well known, so that the description thereof will be omitted.

If the variable $k_p$ is smaller than the set number of times $K_p$ (step ST10 in FIG. 4: YES), the control unit 11 increments the variable $k_p$ (step ST11 in FIG. 4).

Then, the control unit 11 outputs a phase control signal indicating the phase of the MIMO signal in the $k_p$th scan, to the MIMO signal generation unit 2 (step ST12 in FIG. 4).

Further, the control unit 11 outputs a coefficient control signal indicating a plurality of weighting coefficients corresponding to the amount of phase shift of the MIMO signal in the $k_p$th scan, to the beam-forming unit 10 (step ST12 in FIG. 4). Then, the processes of steps ST2 to ST10 are repeatedly performed.

If the variable $k_p$ has reached the set number of times $K_p$ (step ST10 in FIG. 4: NO), the processing of the radar device shown in FIG. 1 ends.

The set number of times $K_p$ may be stored in an internal memory of the control unit 11 or may be given from the outside.

Next described is a fact that, when there is cross-correlation between the plurality of signals for respective transmission antennas included in the MIMO signal demodulated by the demodulation unit 9, noise powers included in the respective beams in the plurality of directions differ from each other.

The radar device shown in FIG. 1 has M reception antennas 6-0 to (M−1), but for simplifying the description, it is supposed that the radar device has only one reception antenna 6-0.

Even if the radar device shown in FIG. 1 has only one reception antenna 6-0, noise powers included in the beams in the plurality of directions are different from each other, as is the case for the radar device including M reception antennas 6-0 to (M−1).

It is supposed that a noise signal included in the MIMO signal demodulated by the demodulation unit 9 is n, and noise signals included in the plurality of signals for respective transmission antennas included in the MIMO signal are $n_0, n_1, \ldots, n_{K-1}$ as represented in the following Equation (1). In the text of the specification, the letter "n" cannot be indicated by boldface because of electronic filing, so the letter "n" is indicated in lightface, but in Equation (1), the letter "n" is indicated by boldface. The same applies to the following Equations (2) and (5).

$$n = [n_0\ n_1 \ldots n_{K-1}]^T \quad (1)$$

In Equation (1), each of the noise signals $n_0$ to $n_{K-1}$ is a complex signal. The average of real parts and the average of imaginary parts in the noise signals $n_0$ to $n_{K-1}$ are each 0, and the variance of the real parts and the variance of the imaginary parts in the noise signals $n_0$ to $n_{K-1}$ are each $\sigma^2/2$.

Assuming that the weight, which is a weighting coefficient used by the beam-forming unit 10 to form beams in a plurality of directions, is w, noise signal $y(\theta, \varphi)$ included in the beam formed by the beam-forming unit 10 is expressed by the following Equation (2). In the text of the specification, the letter "w" cannot be indicated by boldface because of electronic filing, so that the letter "w" is indicated in lightface, but in Equation (2), the letter "w" is indicated by boldface. The same applies to the following Equations (4) to (6), (8) to (11), (15), (17), and (20).

$$y(\theta, \phi) = w^H n \quad (2)$$

Figure 5:
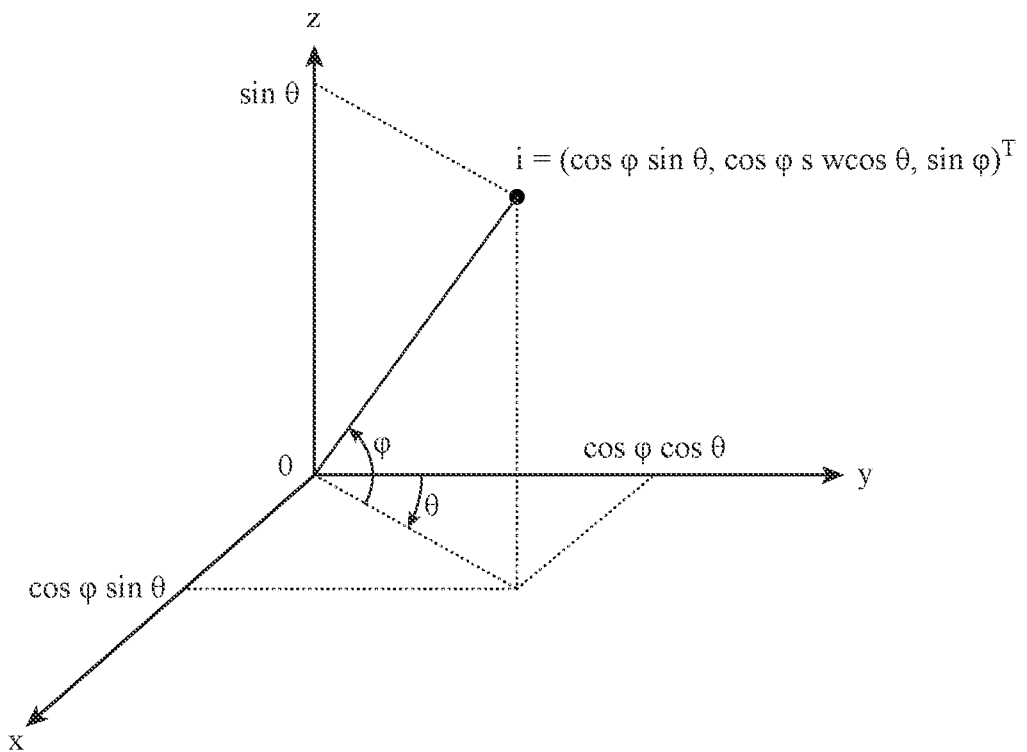
FIG. 5 is an explanatory diagram showing an azimuth angle θ and an elevation angle φ of a beam.

In Equation (2), H is a symbol indicating the complex conjugate transpose.

θ is the azimuth angle of the beam formed by the beam-forming unit 10 as shown in FIG. 5, and φ is the elevation angle of the beam formed by the beam-forming unit 10 as shown in FIG. 5.

FIG. 5 is an explanatory diagram showing the azimuth angle θ and the elevation angle φ of the beam.

The unit directional vector i in the direction in which the beam is formed by the beam-forming unit 10 is expressed by the following Equation (3). In the text of the specification, the letter "i" cannot be indicated by boldface because of electronic filing, so that the letter "i" is indicated in lightface, but in Equation (3), the letter "i" is indicated by boldface. The same applies to the following Equation (4).

$$i = (\cos\phi\sin\theta, \cos\phi\cos\theta, \sin\phi)^T \quad (3)$$

In Equation (3), T is a symbol indicating transposition.

Assuming that the coordinates of the kth (k=0, 1, K−1) transmission antenna 4-k are $d_k^{Tx}$, the weight w is expressed by the following Equation (4).

$$w = \exp\left(j\frac{2\pi}{\lambda}i^T \cdot d_n^{Tx}\right) \quad (4)$$

In Equation (4), $\lambda$ is the wavelength of the transmission signal.

The power $P(\theta, \varphi)$ of the noise signal $y(\theta, \varphi)$ is expressed by the following Equation (5).

$$P(\theta,\phi)=|y(\theta,\varphi)|^2=w^H nn^H w = w^H R_n W$$

$$nn^H = R_n \quad (5)$$

In addition, when the power $P(\theta, \varphi)$ of the noise signal $y(\theta, \varphi)$ is normalized by $\sigma^2$, the noise power $P_n(\theta, \varphi)$, which is the normalized power of the noise signal $y(\theta, \varphi)$, is expressed by the following Equation (6). In the text of the specification, the letter "$C_n$" cannot be indicated by boldface because of electronic filing, so that the letter "$C_n$" is indicated in lightface, but in Equation (6), the letter "$C_n$" is indicated by boldface. The same applies to the following Equation (7).

$$P_n(\theta, \phi) = \frac{P(\theta, \phi)}{\sigma^2} = w^H C_n w \quad (6)$$

$$\frac{R_n}{\sigma^2} = C_n$$

In Equation (6), $C_n$ indicates a correlation matrix of the noise signal n, and is expressed by Equation (7) below.

$$C_n = \begin{bmatrix} \rho_0 & \rho_1 & \cdots & \rho_{N-1} \\ \rho_1^* & \rho_0 & \cdots & \rho_{N-2} \\ \vdots & \vdots & \ddots & \vdots \\ \rho_{N-1}^* & \rho_{N-2}^* & \cdots & \rho_0 \end{bmatrix} \quad (7)$$

In Equation (7), $\rho_0$ indicates an autocorrelation value, and $\rho_0=1$.

Elements other than $\rho_0$ in the correlation matrix $C_n$ indicate cross-correlation values.

For example, $\rho_1$ is a cross-correlation value between the pulse signal transmitted from the transmission antenna 4-0 and the pulse signal transmitted from the transmission antenna 4-1.

* is a symbol representing the complex conjugate.

Assuming that the autocorrelation component of the correlation matrix $C_n$ is $C_{auto}$, and the cross-correlation component of the correlation matrix $C_n$ is $C_{cros}$, the noise power $P_n(\theta, \varphi)$ is expressed by Equation (8) below. In the text of the specification, the letters "$C_{auto}$" and "$C_{cros}$" cannot be indicated by boldface because of electronic filing, so that the letters "$C_{auto}$" and "$C_{cros}$" are indicated in lightface, but in Equation (8), the letters "$C_{auto}$" and "$C_{cros}$" are indicated by boldface. The same applies to the following Equations (9), (10), (13) to (15), and (17).

$$P_n(\theta,\phi)=w^H(C_{auto}+C_{cros})w=w^H C_{auto} w + w^H C_{cros} w \quad (8)$$

The noise power $P_{n,auto}(\theta, \varphi)$ related to the autocorrelation in the noise power $P_n(\theta, \varphi)$ is expressed by the following Equation (9), and the noise power $P_{n,cros}(\theta, \varphi)$ related to the cross-correlation in the noise power $P_n(\theta, \varphi)$ is expressed by the following Equation (10).

$$P_{n,auto}(\theta,\phi)=w^H C_{auto} w \quad (9)$$

$$P_{n,cros}(\theta,\phi)=w^H C_{cors} w \quad (10)$$

When the cross-correlation value of the correlation matrix $C_n$ is 0, all the cross-correlation components $C_{cros}$ in the correlation matrix $C_n$ are 0.

In a case where all the cross-correlation components $C_{cros}$ in the correlation matrix $C_n$ are 0, the correlation matrix $C_n$ is an identity matrix, so that the noise power $P_n(\theta, \varphi)$ is $w^H w = K$, and does not depend on the azimuth angle $\theta$ and the elevation angle $\varphi$ of the beam.

When the cross-correlation value of the correlation matrix $C_n$ is not 0, the noise power $P_n(\theta, \varphi)$ includes the term shown in Equation (10). Therefore, if the azimuth angles $\theta$ or the elevation angles $\varphi$ of the beams are different, the corresponding noise powers $P_n(\theta, \varphi)$ are different.

For example, it is assumed that the number of transmission antennas is two (K=2), the number of reception antennas is one (M=1), and the transmission antenna 4-0 and the reception antenna 6-0 are each located at the origin of the coordinate system shown in FIG. 5. Further, it is assumed that the transmission antenna 4-1 is located at a position where the distance from the origin of the coordinate system shown in FIG. 5 is a half wavelength length of the transmission signal and is located at a position on the x-axis.

Assuming that the beam formed by the beam-forming unit 10 has a direction of $\theta=0$ and $\varphi=0$, for example, the weight $w$ is expressed by the following Equation (11).

$$w=[1 \ \exp(j\pi \sin \theta)]^T \quad (11)$$

Therefore, the noise power $P_{n,auto}(\theta, \varphi)$ related to the autocorrelation indicated by Equation (9) is 2. Further, the noise power $P_{n,cros}(\theta, \varphi)$ related to the cross-correlation indicated by Equation (10) is expressed by the following Equation (11), and depends on the azimuth angle $\theta$ and the elevation angle $\varphi$ indicating the direction in which the beam is formed by the beam-forming unit 10.

$$P_{n,cros}(\theta,\phi)=\rho_1(e^{j\pi \sin \theta}+e^{-j\pi \sin \theta})=2\rho_1 \cos(\pi \sin \theta) \quad (12)$$

Therefore, the noise power $P_n(\theta, \varphi)$ may increase in a specific direction among the plurality of directions of the beams formed by the beam-forming unit 10.

When the control unit 11 changes the noise power $P_n(\theta, \varphi)$ in a specific direction by changing the phase of the MIMO signal on the scan basis, a scanning timing at which the noise power $P_n(\theta, \varphi)$ in the specific direction decreases occurs. At the scanning timing at which the noise power $P_n(\theta, \varphi)$ in a specific direction decreases, performance to detect the target present in the specific direction is enhanced.

Hereinafter, how to obtain an amount of change in phase on the scan basis will be described.

When the scanning timing at which the noise power $P_n(\theta, \varphi)$ in a specific direction decreases occurs in the $k_p$th scan, the noise power $P_{n,cros}(\theta, \varphi)$ related to the cross-correlation indicated in Equation (10) is expressed by the following Equation (13). In the text of the specification, the letters "$w_{kp}$" cannot be indicated by boldface because of electronic filing, so that the letters "$w_{kp}$" are indicated in lightface, but in Equation (13), the letters "$w_{kp}$" are indicated by boldface. The same applies to the following Equations (14) and (15).

$$P_{n,cros}(\theta,\phi,kp)=w_{kp}^H C_{cors} w_{kp} \quad (13)$$

In Equation (13), $w_{kp}$ indicates the weight in the $k_p$th scan.

The average $P_{n,cros,ave}(\theta, \varphi)$ of noise powers $P_{n,cros}(\theta, \varphi)$ related to the cross-correlation in $k_p$ scans is expressed by the following Equation (14).

$$P_{n,cros,ave}(\theta, \phi) = \frac{1}{Kp} \sum_{kp=1}^{Kp} w_{kp}^H C_{cors} w_{kp} \qquad (14)$$

Assuming that, in the $k_p$th scan, the amount of phase shift of each of K pulse signals included in the MIMO signal generated by the MIMO signal generation unit 2 is $\Delta w_{kp}$, the average $P_{n,cros,ave}(\theta, \phi)$ in $k_p$ scans is expressed by the following Equation (15).

$$P_{n,cros,ave}(\theta, \phi) = \frac{1}{Kp} \sum_{kp=1}^{Kp} (w \odot \Delta w_{kp})^H C_{cors}(w \odot \Delta w_{kp}) \qquad (15)$$

In Equation (15), the symbol in which "•" is included in "○" is a symbol indicating the Hadamard product. The Hadamard product is the product of the elements of matrices of the same size.

The control unit 11 sets an evaluation function for evaluating the variance of the average $P_{n,cros,ave}(\theta, \phi)$ in $k_p$ scans indicated in Equation (15) as $V[P_{n,cros,ave}(\theta, \phi)]$, and obtains an amount of phase shift $\Delta w_{kp}$ that minimizes the evaluation function $V[P_{n,cros,ave}(\theta, \phi)]$ as represented by Equation (16). In the text of the specification, the letters "$w_{opt}$" cannot be indicated by boldface because of electronic filing, so that the letters "$w_{opt}$" are indicated in lightface, but in Equation (16), the letters "$w_{opt}$" are indicated by boldface.

$$\Delta w_{opt,kp} = \arg \min_{\Delta w_{kp}} V[P_{n,cros,ave}(\theta, \phi)] \qquad (16)$$

The control unit 11 determines the amount of phase shift $\Delta w_{kp}$ that minimizes the evaluation function $V[P_{n,cros,ave}(\theta, \phi)]$, as an amount of phase shift $\Delta w_{opt,kp}$ in the $k_p$th scan.

For example, it is assumed that the number of transmission antennas is two, the number of reception antennas is one, and the transmission antenna 4-0 and the reception antenna 6-0 are each located at the origin of the coordinate system shown in FIG. 5. Further, it is assumed that the transmission antenna 4-1 is located at a position where the distance from the origin of the coordinate system shown in FIG. 5 is a half wavelength length of the transmission signal and is located at a position on the x-axis.

In addition, it is assumed that the beam formed by the beam-forming unit 10 has a direction of $\theta=0$ and $\phi=0$, for example, and the noise power $P_n(\theta, \phi)$ in a specific direction is reduced in the second scan ($k_p=2$).

When the amount of phase shift $\Delta w_1$ with respect to all elements of the weight w in the first scan ($k_p=1$) is 1, and the amount of phase shift with respect to all elements of the weight w in the second scan ($k_p=2$) is $\Delta w_2$, the average $P_{n,cros,ave}(\theta, \phi)$ in the two scans is expressed by Equation (17) below.

$$P_{n,cros,ave}(\theta, \phi) = \frac{1}{2}\{w^H C_{cros} w + (w \odot \Delta w_2)^H C_{cros}(w \odot \Delta w_2)\} \qquad (17)$$
$$= \frac{1}{2}\{2\rho_1 \cos(\pi \sin \theta) +$$
$$\Delta(w \odot \Delta w_2)^H C_{cros}(w \odot w_2)\}$$

Assuming that the phase difference between the phase of the pulse signal transmitted from the transmission antenna 4-0 and the phase of the pulse signal transmitted from the transmission antenna 4-1 is $\pi$, the amount of phase shift $\Delta w_2$ is expressed by the following Equation (18).

$$\Delta w_2 = [1 \ e^{j\pi}]^T \qquad (18)$$

When the amount of phase shift $\Delta w_2$ is expressed by Equation (18), the average $P_{n,cros,ave}(\theta, \phi)$ in the two scans is 0 as expressed by the following Equation (19).

$$P_{n,cros,ave}(\theta, \phi) = \frac{1}{2}\{2\rho_1 \cos(\pi \sin \theta) - 2\rho_1 \cos(\pi \sin \theta)\} = 0 \qquad (19)$$

In addition, the variance of the average $P_{n,cros,ave}(\theta, \phi)$ in the two scans is also 0, and thus, the variance of the average $P_{n,cros,ave}(\theta, \phi)$ in the two scans is minimized.

The control unit 11 determines the amount of phase shift $\Delta w_{opt,kp}$ of the MIMO signal in the $k_p$th ($k_p=1, 2 \ldots K_p$) scan on the basis of Equation (16), and stores the determined amount of phase shift $\Delta w_{opt,kp}$ in, for example, the internal memory, before the target detection unit 12 starts the process of detecting the target.

For example, the phase of the MIMO signal in the first scan ($k_p=1$) is a reference phase, and the amount of phase shift $\Delta w_{opt,kp}$ in the $k_p$th ($k_p=1, 2 \ldots K_p$) scan is an amount of phase shift from the reference phase.

When the target detection unit 12 starts the process of detecting a target, the control unit 11 reads the amount of phase shift $\Delta w_{opt,kp}$ of the MIMO signal in the $k_p$th scan, which is stored in, for example, the internal memory, and adds the amount of phase shift $\Delta w_{opt,kp}$ to the reference phase.

The control unit 11 outputs a phase control signal indicating the phase obtained by the addition of the amount of phase shift, to the MIMO signal generation unit 2.

The MIMO signal generation unit 2 generates a MIMO signal having the phase indicated by the phase control signal output from the control unit 11.

Further, the control unit 11 calculates a weight w' corresponding to the amount of phase shift $\Delta w_{opt,kp}$ as represented by Equation (20) below.

$$w' = w \odot \Delta w_{kp} \qquad (20)$$

Further, the control unit 11 outputs a coefficient control signal indicating the calculated weight w' to the beam-forming unit 10.

The beam-forming unit 10 multiplies the plurality of signals for respective transmission antennas output from the demodulation unit 9 by a respective plurality of elements included in the weight w' indicated by the coefficient control signal output from the control unit 11, thereby forming beams in a plurality of different directions.

In the radar device shown in FIG. 1, when the target detection unit 12 is performing the process of detecting a target, the control unit 11 needs to perform a process of adding the amount of phase shift $\Delta w_{opt,kp}$ to the reference phase, and of outputting the phase control signal indicating the phase obtained by the addition of the amount of phase shift to the MIMO signal generation unit 2. Further, the control unit 11 needs to perform a process of calculating the weight w' corresponding to the amount of phase shift $\Delta w_{opt,kp}$, and of outputting the coefficient control signal indicating the weight w' to the beam-forming unit 10.

However, these processes of the control unit 11 are simply an addition process and a process for calculating the Hadamard product, and are significantly smaller in computation scale than the signal processing for generating a whitening matrix and the signal processing for multiplying the MIMO signal by the whitening matrix.

In the first embodiment described above, the radar device is configured so that the control unit 11 shifts the phase of the MIMO signal generated by the signal transmission unit 1, and adjusts a plurality of weighting coefficients on the basis the amount of phase shift, thereby changing noise power included in each of beams in a plurality of directions formed by the beam-forming unit 10. Therefore, the radar device can reduce the deterioration of the ability to detect a target, without performing the signal processing for generating a whitening matrix and the signal processing for multiplying the MIMO signal by the whitening matrix.

Second Embodiment

In the radar device shown in FIG. 1, the control unit 11 shifts the phase of the MIMO signal generated by the signal transmission unit 1, each time one scan is completed.

However, this is merely an example, and the control unit 11 may shift the phase of the MIMO signal generated by the signal transmission unit 1, for every coherent processing interval (CPI) that is an interval in which the reflection signal is converted into a frequency domain signal by the demodulation unit 9.

Similar to the radar device shown in FIG. 1, a radar device according to a second embodiment can suppress the deterioration of the ability to detect a target, without performing the signal processing for generating a whitening matrix and the signal processing for multiplying the MIMO signal by the whitening matrix.

It is to be noted that the above embodiments can be freely combined, or any component in each of the embodiments can be modified or omitted, within the scope of the present invention.

INDUSTRIAL APPLICABILITY

The present invention is suitable for a radar device and a signal processing method for detecting a target.

REFERENCE SIGNS LIST

1: signal transmission unit, 2: MIMO signal generation unit, 3: transmission signal generation unit, 3a: local oscillator, 4-0 to 4-(K−1): transmission antenna, 5: signal reception unit, 6-0 to 6-(M−1): reception antenna, 7: signal reception processing unit, 7a: A/D converter, 8: signal processing unit, 9: demodulation unit, 10: beam-forming unit, 11: control unit, 12: target detection unit, 21: demodulation circuit, 22: beam-forming circuit, 23: control circuit, 24: target detection circuit, 31: processor, 32: memory

The invention claimed is:

1. A radar device comprising:
a signal transmitter configured to generate a multiple-input multiple-output (MIMO) signal including a plurality of pulse signals, and radiate the MIMO signal into space;
a signal receiver configured to receive a reflection signal resulting from reflection, by a target, of the MIMO signal radiated from the signal transmitter;
demodulation circuitry configured to demodulate the MIMO signal from the reflection signal received by the signal receiver;
beam-forming circuitry configured to form beams in a plurality of different directions, by multiplying the plurality of pulse signals included in the MIMO signal demodulated by the demodulation circuitry by a respective plurality of different weighting coefficients;
control circuitry configured to change noise power included in each of the beams in the plurality of directions formed by the beam-forming circuitry, by shifting a phase of the MIMO signal generated by the signal transmitter and adjusting the plurality of weighting coefficients on a basis of an amount of phase shift of the phase; and
target detection circuitry configured to detect the target from each of the beams in the plurality of directions formed by the beam-forming circuitry.

2. The radar device according to claim 1, wherein the control circuitry shifts the phase of the MIMO signal generated by the signal transmitter, each time one scan in which the MIMO signal is repeatedly radiated from the signal transmitter to a search area of the target is completed.

3. The radar device according to claim 1, wherein the demodulation circuitry converts the reflection signal received by the signal receiver into a frequency domain signal, and demodulates the MIMO signal by determining a plurality of frequency components included in the frequency domain signal to be the respective plurality of pulse signals included in the MIMO signal generated by the signal transmitter.

4. The radar device according to claim 3, wherein the control circuitry shifts the phase of the MIMO signal generated by the signal transmitter, each time the reflection signal is converted into the frequency domain signal by the demodulation circuitry.

5. The radar device according to claim 1, wherein, when the beam-forming circuitry forms the beams in the plurality of different directions multiple times, the control circuitry calculates an amount of phase shift of the phase of the MIMO signal that minimizes variance of noise powers included in the respective beams in the plurality of directions, and shifts the phase of the MIMO signal generated by the signal transmitter on a basis of the calculated amount of phase shift.

6. A signal processing method comprising:
generating a multiple-input multiple-output (MIMO) signal including a plurality of pulse signals, and radiating the MIMO signal into space;
receiving a reflection signal resulting from reflection, by a target, of the radiated MIMO signal;
demodulating the MIMO signal from the received reflection signal;
forming beams in a plurality of different directions, by multiplying the plurality of pulse signals included in the demodulated MIMO signal by a respective plurality of different weighting coefficients;
changing noise power included in each of the formed beams in the plurality of directions, by shifting a phase of the generated MIMO signal and adjusting the plurality of weighting coefficients on a basis of an amount of phase shift of the phase; and
detecting the target from each of the formed beams in the plurality of directions.

* * * * *